US007103035B1

(12) United States Patent
Kanuri

(10) Patent No.: US 7,103,035 B1
(45) Date of Patent: Sep. 5, 2006

(54) ARRANGEMENT FOR SEARCHING NETWORK ADDRESSES IN A NETWORK SWITCH USING MULTIPLE TABLES BASED ON SUBNET IDENTIFIER

(75) Inventor: Mrudula Kanuri, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/482,956

(22) Filed: Jan. 14, 2000

(51) Int. Cl.
*H04L 12/66* (2006.01)
*H04L 12/28* (2006.01)
*H04Q 7/24* (2006.01)

(52) U.S. Cl. .................. 370/356; 370/389; 370/392; 370/395.32

(58) Field of Classification Search ............... 370/218, 370/235, 236, 254, 255, 352–356, 360, 395.3, 370/395.52, 395.63, 395.64, 389, 392, 396, 370/397, 469, 467, 902, 912, 400, 401; 709/238
See application file for complete search history.

(56) References Cited

U.S. PATENT DOCUMENTS

| | | | | |
|---|---|---|---|---|
| 5,914,938 A * | 6/1999 | Brady et al. ................. | 370/254 |
| 5,920,566 A * | 7/1999 | Hendel et al. ............... | 370/401 |
| 5,953,335 A | 9/1999 | Erimli et al. | |
| 6,023,563 A * | 2/2000 | Shani ........................... | 709/249 |
| 6,081,522 A * | 6/2000 | Hendel et al. ............... | 370/389 |
| 6,088,356 A * | 7/2000 | Hendel et al. ............... | 370/392 |
| 6,104,696 A * | 8/2000 | Kadambi et al. ............ | 370/218 |
| 6,115,385 A * | 9/2000 | Vig ............................... | 370/401 |
| 6,118,760 A * | 9/2000 | Zaumen et al. .............. | 370/229 |
| 6,256,314 B1 * | 7/2001 | Rodrig et al. ................ | 370/401 |
| 6,262,988 B1 * | 7/2001 | Vig ............................... | 370/401 |
| 6,266,705 B1 * | 7/2001 | Ullum et al. ................. | 709/238 |
| 6,301,667 B1 * | 10/2001 | Digiacomo et al. .......... | 713/201 |
| 6,304,912 B1 * | 10/2001 | Oguchi et al. ............... | 709/238 |
| 6,335,935 B1 * | 1/2002 | Kadambi et al. ............ | 370/396 |
| 6,397,260 B1 * | 5/2002 | Wils et al. .................... | 709/238 |
| 6,424,650 B1 * | 7/2002 | Yang et al. ................... | 370/390 |
| 6,529,503 B1 * | 3/2003 | Chiang et al. ............... | 370/363 |
| 6,553,028 B1 * | 4/2003 | Tang et al. ................... | 370/389 |
| 6,560,229 B1 * | 5/2003 | Kadambi et al. ............ | 370/392 |
| 6,661,787 B1 * | 12/2003 | O'Connell et al. .......... | 370/389 |
| 6,697,338 B1 * | 2/2004 | Breitbart et al. ............. | 370/254 |

(Continued)

*Primary Examiner*—Chi Pham
*Assistant Examiner*—Melanie Jagannathan
(74) *Attorney, Agent, or Firm*—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a switching module for performing layer 2 and layer 3 switching operations, and a plurality of network switch ports, each configured for connecting the network switch to a corresponding subnetwork. The switching module includes a plurality of address tables for storing address information (e.g., layer 2 and layer 3 address and switching information), where each table is configured for storing the address information of a corresponding one of the subnetworks. The use of multiple address tables within the switching module enables the time for looking up address information to be substantially reduced, especially since the multiple address tables can be accessed independently and simultaneously by the switching module. Moreover, the identification of each table by a corresponding subnetwork identifier enables the multiple address tables to be managed efficiently, merely by obtaining the subnetwork identifier from the received layer 2 packet. Hence, layer 3 address information for a given layer 2 packet can be obtained merely by searching the selected address table using the host identifier as a search key.

22 Claims, 2 Drawing Sheets

U.S. PATENT DOCUMENTS 6,807,172 B1 * 10/2004 Levenson et al. ........... 370/389

6,907,469 B1 * 6/2005 Gallo et al. ................. 709/238

* cited by examiner

ARRANGEMENT FOR SEARCHING NETWORK ADDRESSES IN A NETWORK SWITCH USING MULTIPLE TABLES BASED ON SUBNET IDENTIFIER

This application claims priority from Provisional Application No. 60/167,219, filed Nov. 24, 1999.

BACKGROUND OF THE INVENTION

1. Field of the Invention

The present invention relates to layer 2 and layer 3 switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). For example, conventional network switches use centralized switching core having a centralized address lookup table that stores addressing information and frame forwarding decisions for the corresponding address entries, for example 4096 (4k) entries. Layer 3 processing, however, requires implementation of user-defined policies that include searching a large number of fields for specific values. These user-defined policies may specify what type of data traffic may be given priority accesses at prescribed intervals; for example, one user defined policy may limit Internet browsing by employees during work hours, and another user-defined policy may assign a high priority to e-mail messages from corporate executives. Hence, the number of such user policies may be very large, posing a substantial burden on performance of layer 3 processing at the wire rates, especially if the centralized switching core needs to rely on accessing a centralized address table for the multiple network switch ports.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets.

There is also a need for an arrangement that enables a network switch to perform optimized address searching in a switching module in a manner that minimizes the time necessary to perform address lookup search.

These and other needs are attained by the present invention, where a network switch includes a switching module and network switch ports connecting respective subnetworks. The switching module includes a plurality of address tables for storing address information (e.g., layer 2 and layer 3 address and switching information), where each table is configured for storing the address information of a corresponding one of the subnetworks.

One aspect of the present invention provides a method in an integrated network switch having a switching module, the integrated network switch configured for switching a layer 2 data packet within a network having a plurality of subnetworks. The method includes obtaining, from the layer 2 packet, layer 3 packet information having a network identifier, a subnetwork identifier, and a host identifier, the subnetwork identifier identifying a corresponding one of the subnetworks and the host identifier identifying a transmitting node having transmitted the layer 3 packet information from within the one subnetwork. The method also includes storing address information from the layer 2 packet, including the host identifier, in a selected one of a plurality of address tables within the switching module based on the corresponding subnetwork identifier, each of the address tables configured for storing the host identifiers of respective transmitting nodes of a corresponding one of the subnetworks. The use of multiple address tables within the switching module enables the time for looking up address information to be substantially reduced, especially since the multiple address tables can be accessed independently and simultaneously by the switching module. Moreover, the identification of each table by a corresponding subnetwork identifier enables the multiple address tables to be managed efficiently, merely by obtaining the subnetwork identifier from the received layer 2 packet. Hence, layer 3 address information for a given layer 2 packet can be obtained merely by searching the selected address table using the host identifier as a search key.

Another aspect of the present invention provides a method in an integrated network switch having a switching module, the integrated network switch configured for switching a layer 2 data packet within a network having a plurality of subnetworks. The method includes obtaining, from the layer 2 packet, layer 3 packet information having a network identifier, a subnetwork identifier, and a host identifier, the subnetwork identifier identifying a corresponding one of the subnetworks and the host identifier identifying a transmitting node having transmitted the layer 3 packet information from within the one subnetwork. The method also includes selecting one of a plurality of address tables within the switching module based on the corresponding subnetwork identifier, each of the address tables configured for storing the host identifiers of respective transmitting nodes of a corresponding one of the subnetworks. The method also includes searching the one selected address table for layer 3 switching information for the layer 2 packet based on the host identifier. Selection of an address table based on the corresponding subnetwork identifier enables the switching module to perform multiple independent searches on a per-subnetwork basis. Moreover, the use of multiple tables dramatically reduces the size of the table to be searched, enabling the use of simpler search techniques such as linked-list searching for the table entry having the corresponding host identifier, as opposed to more complex search techniques such as hashing and bin-chaining search techniques.

Still another aspect of the present invention provides an integrated network switch configured for switching layer 2 data packets at a wire rate. The integrated network switch includes a plurality of network switch ports, each configured for receiving a layer 2 data packet having layer 3 packet information having a network identifier, a subnetwork identifier, and a host identifier. The layer 2 data packet is received by the corresponding network switch port from a network node having the corresponding host identifier and belonging to a corresponding subnetwork having the corresponding subnetwork identifier. The integrated network switch also includes a switching module configured for switching the layer 2 data packets between the network switch ports according to layer 3 switching information, the switching module including a plurality of address tables for storing the layer 3 switching information for the respective subnetworks, the switching module accessing a selected one of the address tables based on the corresponding subnetwork identifer and searching for the layer 3 switching information of the received layer 2 data packet based on the corresponding host identifier.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
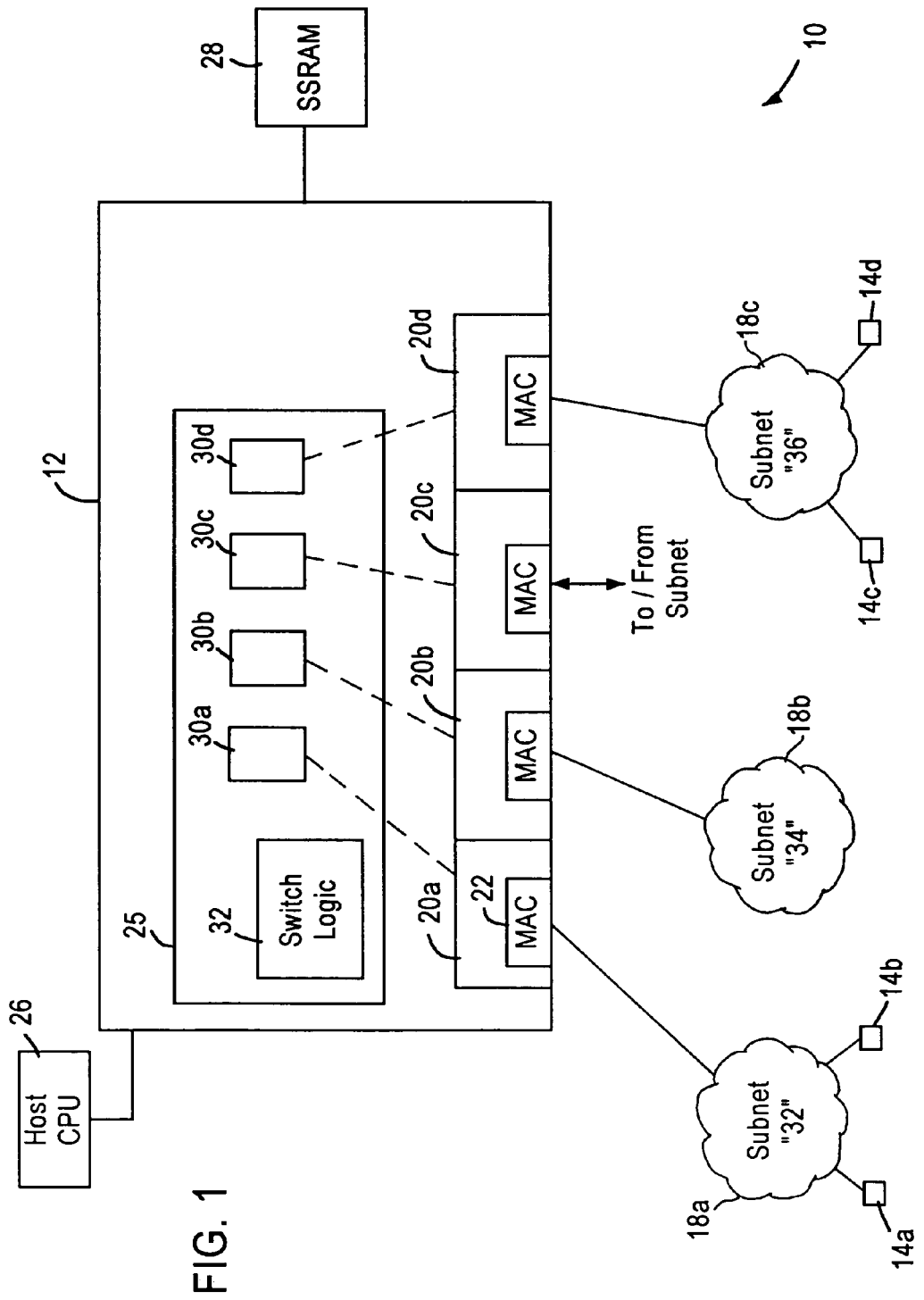
FIG. 1 is a block diagram of a packet switched network having a network switch for switching data packets between subnetworks according to an embodiment of the present invention.

FIG. 1 is a block diagram illustrating a packet switched network 10, such as an Ethernet (IEEE 802.3) network. The packet switched network includes an integrated (i.e., single chip) multiport switch 12 that enables communication of data packets between network stations 14. Each network station 14, for example a client workstation, is typically configured for sending and receiving data packets at 10 Mbps or 100 Mbps according to IEEE 802.3 protocol.

As shown in FIG. 1, the network 10 includes a plurality of subnetworks 18a, 18b, and 18c, each having a corresponding group of network stations 14 and a unique subnetwork identifier (e.g., "32", "34", and "36", respectively). Each network station 14 within a given subnetwork 18 has a host identifier that enables the transmitting network station 14 to be uniquely identified within the corresponding subnetwork 18. Hence, the switch 12 can uniquely identify any transmitting node within the network 10 based on the subnetwork identifier and the host identifier within a received data packet, described in further detail below.

The switch 12 includes switch ports 20, each including a media access control (MAC) module 22 that transmits and receives data packets to the associated network stations 14 across 10/100 Mbps physical layer (PHY) transceivers (not shown) according to IEEE 802.3u protocol. The switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric is also configured for selective layer 3 switching decisions based on evaluation of IP address information within the Ethernet packet.

As shown in FIG. 1, the switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

Each switch port 20 of FIG. 1 is configured for performing layer 3 processing that enables the switching fabric 25 to identify a selected layer 3 switching entry to execute the appropriate layer 3 switching decision corresponding to the identified layer 3 switching entry.

Moreover, the switch fabric 25 is configured to include multiple address tables that are configured to optimize lookup times for address entries. Specifically, each address table 30 is configured for storing the layer 2 and layer 3 switching information for the corresponding subnetwork 18. Hence, the switch module 25, under the control of switching logic 32, accesses a selected one of the address tables 30 based on the corresponding subnetwork identifier. The switching module 25 can then search within the selected address table (e.g., 30a) for the layer 3 switching information of the received layer 2 data packet based on the corresponding host identifier. Hence, search times can be dramatically reduced by providing a plurality of address tables 30 that can be independently accessed by the switching logic 32 on a per-subnetwork basis. As illustrated in FIG. 1, each of the address tables 30 are assigned to the corresponding one of the network switch ports 20, enabling each network switch port to handle a corresponding subnetwork 18. Hence, the switching logic 25 is capable of providing lookup processing for each of the ports 20 simultaneously and in parallel, merely by identifying the table by the subnet identifier supported by the corresponding switch port 20.

Hence, since the network switch 12 is configured for supporting a single network 10 within a fixed network identifier field, and since each table 30 is identified by the corresponding subnetwork identifier, each table 30 no longer needs to store a network identifier or a subnetwork identifier, but needs to store only the host identifier and the corresponding switching information.

Figure 2:
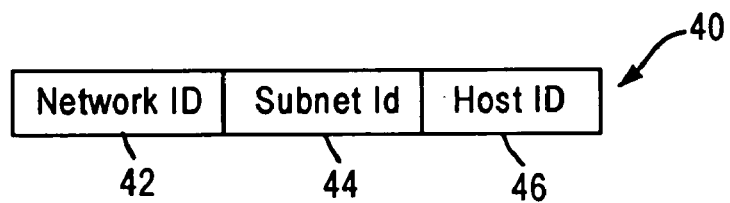
FIG. 2 is a diagram illustrating an Internet Protocol (IP) address having a network identifier field, a subnetwork identifier field, and a host identifier field.

FIG. 2 is a block diagram illustrating an IP address field 40, for example an IP source address field, that includes a network identifier field 42, a subnetwork identifier field 44, and a host identifier field 46. The IP address field 40 is 32 bits (4 bytes) wide. Any IP address 40 can be typically classified into one of the following five classes: CLASS A, CLASS B, CLASS C, CLASS D, and CLASS E. The CLASS A packet includes one byte of network identifier field 42, and three bytes of subnetwork identifier field 44 and host identifier field 46; hence, the range of CLASS A network identifier fields is 0–127. The CLASS B packet includes two bytes of network identifier field 42, and two bytes of subnetwork identifier field 44 and host identifier field 46; hence, the range of CLASS B network identifier fields is 128–191. The CLASS C packet includes a three bytes of network identifier field 42, and one byte of subnet identifier field 44 and host identifier field 46; hence, the range of CLASS C network identifier fields is 192–223. The CLASS D packet is used for multicast purposes, and the CLASS E packet is for reserved addresses.

When a CLASS A address is assigned to a company or a firm, the company is given only the first byte of the address by the IANA. For example, assume a company is given the network identifier "122"; the company can then use all the addresses in the range 122.0.0.0 to 122.254.254.254. To simplify the task of routing, the remaining three bytes are divided into two fields, namely the subnet identifier field 44 and the host identifier field 46. The network administrator of the company can then divide the three bytes in any way desirable, for example one byte for the subnet identifier field 44 and two bytes for the host identifier field 46, or vice versa: Note that any other combination is also possible, and the subnet identifier field 44 and the host identifier field 46 do not necessarily need to be divided on byte boundaries.

Once the division within the IP address field 40 has been performed to establish the lengths of the network identifier field 42, the subnetwork identifier field 44, and the host identifier field 46, then the switching logic 25 is configured with a subnetwork mask that identifies how the fields are divided. For example, assume that the network administrator uses one byte for the subnetwork ID and two bytes for the host ID. Hence, the network "122" can have $2^8$ (256) subnetworks and $2^{16}$ host stations 14 in each subnetwork 18.

According to the disclosed embodiment, once the switch 12 is implemented within a network 10 having the established subnetworks 18a, 18b, and 18c, the network switch 12 can identify the subnetwork 18 that the incoming data packet came from, merely by looking at the subnetwork identifier field 44 within the IP source address field 40, and by using the appropriate mask.

Figure 3:
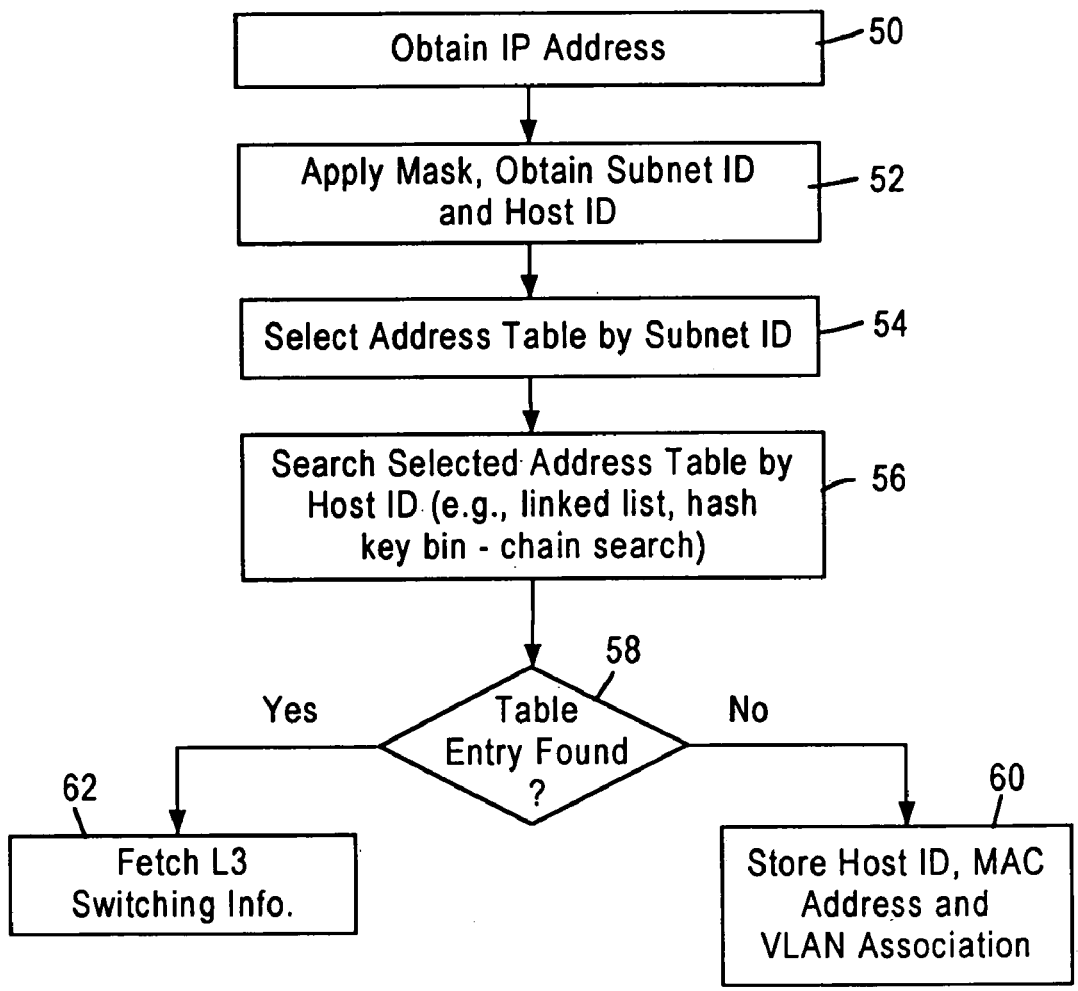
FIG. 3 is a diagram illustrating the method of performing address searches using the multiple address tables of FIG. 1 according to an embodiment of the present invention.

FIG. 3 is a diagram illustrating the method of searching for address information within the switching module 25 according to an embodiment of the present invention. The method begins by a network switch port 20 receiving a layer 2 data packet and obtaining the IP address in step 50. In particular, each network switch port 20 is configured for obtaining the layer 3 address information, including IP source address, IP destination address, etc., and recovering the subnet identifier 44 and the host identifier 46 from the IP address field 40. The network switch port 20 applies a subnetwork mask in step 52, and obtains the subnet identifier field 44 and the host identifier field 46. For example, the switch port 20 performs a bitwise AND between the subnet mask "255.255.0.0" and the IP source address "122.32.3.2" to obtain the value "122.32.0.0". Hence, the switch port 20 can determine that the network identifier field 42 has a value of "122", the subnetwork identifier field 44 has a value of "32", and the host identifier field 46 has a value of "3.2".

The network switch port 20 supplies the subnetwork identifier field 44 and the host identifier field 46 to switching logic 32 within the switch fabric 25 for lookup processing, while ignoring the network identifier 42. In particular, the switching logic 32 is configured for performing simultaneous and independent lookups of each of the address tables 30a, 30b, 30c, and 30d. The switching logic 32, in response to receiving the subnetwork identifier field 44 having a value of "32", selects the appropriate address table (e.g., table 30a) in step 54 for searching of address entries for the corresponding subnetwork 18a. The switching logic 32 then searches in step 56 the selected address table 30a for an address entry having a host identifier field 46 that corresponds to the host identifier value "3.2" of the received data packet. Different search techniques may be used, for example a hash key may be generated from the host identifier value 46 to perform a bin-chain search, although preferably a simple linked list search is performed using the host identifier field 46 as the search key.

If the switching logic 32 does not find the table entry in step 58, then the switching logic 32 stores in step 60 address information from the layer 2 packet, including the host identifier 46, the MAC address, and any virtual LAN (VLAN) association information to be used for learning operations. However if the switching logic 32 does find the table entry in step 58, then the switching logic 32 fetches the layer 3 switching information in step 62.

According to the disclosed embodiment, address lookup information is stored into a plurality of address tables (e.g., each storing 1k entries) based on subnetwork identifier values, hence, search performance is dramatically improved over conventional arrangements that use a single, large (e.g., 4k entries) address lookup table. Table width is reduced, since the plurality of address tables do not need to store the network identifier field 42 or the subnetwork identifier field 44. In addition, dividing the address tables based on subnet ID enables each table to be searched using the host identifier field 46, dramatically simplifying the search routine for layer 3 switching operations.

Although the disclosed arrangement is described with respect to CLASS A addresses, the disclosed techniques are equally applicable to CLASS B and CLASS C addresses. In addition, although the disclosed arrangement assigns each address table 30 to a corresponding network switch port 20, such arrangement is not necessary if each of the network switch port does not service a corresponding subnetwork 18; hence, if an address class used on a particular switch port 20 does not support subnetwork addressing as described above, then an address table 30 does not need to be assigned to that particular switch port 20.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated network switch having a switching module, the integrated network switch configured for switching a layer 2 data packet within a network having a plurality of subnetworks, the method comprising:
obtaining, from the layer 2 packet, layer 3 packet information having a network identifier, a subnetwork identifier, and a host identifier, the subnetwork identifier identifying a corresponding one of the subnetworks and the host identifier identifying a transmitting node having transmitted the layer 3 packet information from within the one subnetwork; and
storing address information from the layer 2 packet, including the host identifier, in a selected one of a plurality of address tables within the switching module based on the corresponding subnetwork identifier, each of the address tables configured for storing the host identifiers of respective transmitting nodes of a corresponding one of the subnetworks.

2. The method of claim 1, wherein received data packet includes an Internet Protocol (IP) header, the storing step including storing the host identifier from the IP header and layer 2 address information from the layer 2 packet into a single table entry of the selected one address table.

3. The method of claim 2, wherein the network switch includes a plurality of network switch ports each connected to a corresponding one of the subnetworks, the storing step including selecting the one address table based on the one network switch port having received the layer 2 packet.

4. The method of claim 3, further comprising assigning each of the address tables to a corresponding one of the network switch ports.

5. The method of claim 2, wherein the obtaining step comprises:
obtaining an IP source address from the IP header;
obtaining the subnetwork identifier and the host identifier from the IP source address.

6. The method of claim 5, wherein the storing step comprises:
searching the selected one address table for a stored table entry having layer 3 switching information based solely on the host identifier; and
storing the address information from the layer 2 packet into the selected one address table based on a determined absence of the stored table entry.

7. The method of claim 6, wherein the searching step includes searching for the stored table entry by using the host identifier as a key according to a linked list search.

8. The method of claim 6, wherein the searching step includes:
generating a hash key based on the host identifier; and
searching for the stored table entry using the generated hash key.

9. The method of claim 6, wherein the network switch is an integrated circuit chip, the searching step including searching the selected one address table for switching of the layer 2 data packet according to a wire rate.

10. A method in an integrated network switch having a switching module, the integrated network switch configured for switching a layer 2 data packet within a network having a plurality of subnetworks, the method comprising:
obtaining, from the layer 2 packet, layer 3 packet information having a network identifier, a subnetwork identifier, and a host identifier, the subnetwork identifier identifying a corresponding one of the subnetworks and the host identifier identifying a transmitting node having transmitted the layer 3 packet information from within the one subnetwork;
selecting one of a plurality of address tables within the switching module based on the corresponding subnetwork identifier, each of the address tables configured for storing the host identifiers of respective transmitting nodes of a corresponding one of the subnetworks; and
searching the one selected address table for layer 3 switching information for the layer 2 packet based on the host identifier.

11. The method of claim 10, wherein the received data packet includes an Internet Protocol (IP) header, the obtaining step including obtaining the subnetwork identifier and the host identifier from the IP header.

12. The method of claim 11, wherein the network switch includes a plurality of network switch ports each connected to a corresponding one of the subnetworks, the selecting step including selecting the one address table based on the one network switch port having received the layer 2 packet.

13. The method of claim 12, further comprising assigning each of the address tables to a corresponding one of the network switch ports.

14. The method of claim 10, wherein the searching step includes searching for the stored table entry by using the host identifier as a key according to a linked list search.

15. The method of claim 10, wherein the searching step includes:
generating a hash key based on the host identifier; and
searching for the stored table entry using the generated hash key.

16. The method of claim 10, further comprising storing address information from the layer 2 packet, including the host identifier, in the one selected address table based on a determined absence of the host identifier in the one selected address table.

17. An integrated network switch configured for switching layer 2 data packets at a wire rate, the integrated network switch including:
a plurality of network switch ports, each configured for receiving a layer 2 data packet, having layer 3 packet information having a network identifier, a subnetwork identifier, and a host identifier, from a network node having the corresponding host identifier and belonging to a corresponding subnetwork having the corresponding subnetwork identifier; and
a switching module configured for switching the layer 2 data packets between the network switch ports according to layer 3 switching information, the switching module including a plurality of address tables for storing the layer 3 switching information for the respective subnetworks, the switching module accessing a selected one of the address tables based on the corresponding subnetwork identifer and searching for the layer 3 switching information of the received layer 2 data packet based on the corresponding host identifier.

18. The switch of claim 17, wherein the switching module is configured for independently and simultaneously accessing the address tables for the layer 3 switching information of the respective subnetworks.

19. The switch of claim 18, wherein the switching module is configured for searching each address table, based on the host identifier, using one of a linked list search and a hash key-based bin search.

20. The switch of claim 18, wherein each of the switch ports obtains the subnetwork identifier and the host identifier from the corresponding layer 2 packet.

21. The switch of claim 17, wherein each network switch port is connected to a corresponding one of the subnetworks, the switching module accessing the selected one address table based on the one network switch port having received the layer 2 packet.

22. The switch of claim 21, wherein each address table is assigned to a corresponding one of the network switch ports.

* * * * *